United States Patent
Liu

(10) Patent No.: US 9,722,857 B2
(45) Date of Patent: Aug. 1, 2017

(54) NODE MARKING FOR CONTROL PLANE OPERATION

(75) Inventor: Stephen Shyan-Shiang Liu, Acton, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 747 days.

(21) Appl. No.: 13/606,356

(22) Filed: Sep. 7, 2012

(65) Prior Publication Data

US 2014/0075049 A1     Mar. 13, 2014

(51) Int. Cl.
| G06F 15/173 | (2006.01) |
| H04L 12/24 | (2006.01) |
| H04L 29/06 | (2006.01) |
| H04L 12/851 | (2013.01) |
| H04L 12/813 | (2013.01) |
| G06F 21/62 | (2013.01) |
| H04M 15/00 | (2006.01) |

(52) U.S. Cl.
CPC .......... H04L 41/04 (2013.01); H04L 41/0893 (2013.01); *G06F 21/62* (2013.01); *H04L 41/5003* (2013.01); *H04L 47/20* (2013.01); *H04L 47/2408* (2013.01); *H04L 63/0263* (2013.01); *H04L 63/20* (2013.01); *H04L 69/161* (2013.01); *H04M 15/56* (2013.01)

(58) Field of Classification Search
CPC ..... H04L 63/20; H04L 41/0893; H04L 47/20; H04L 41/5003; H04L 47/2408; H04L 63/0263; H04L 69/161; H04L 12/1407; H04L 47/00; H04L 63/00; H04L 41/04; H04M 15/66; G06F 21/62
USPC .......................................................... 709/244
See application file for complete search history.

(56) References Cited

U.S. PATENT DOCUMENTS

| 8,683,560 B1 * | 3/2014 | Brooker .................. H04L 63/08 713/155 |
| 8,769,642 B1 * | 7/2014 | O'Neill ................... H04L 63/10 726/1 |
| 9,237,155 B1 * | 1/2016 | Cavage ................. G06F 9/5077 |
| 2003/0115179 A1 * | 6/2003 | Prabakaran et al. ............. 707/1 |
| 2004/0042470 A1 * | 3/2004 | Cooper ............... H04L 12/2602 370/401 |
| 2004/0165588 A1 * | 8/2004 | Pandya ........................ 370/389 |
| 2005/0047412 A1 * | 3/2005 | Hares .................. H04L 41/0893 370/392 |
| 2005/0276218 A1 * | 12/2005 | Ooghe ................. H04L 12/5695 370/229 |
| 2010/0214913 A1 * | 8/2010 | Kompella ........... H04L 12/5695 370/230 |
| 2010/0299399 A1 * | 11/2010 | Wanser ................ G06Q 10/107 709/206 |

(Continued)

*Primary Examiner* — Oleg Survillo

(57) ABSTRACT

A system assigns, to selected network devices in an intelligent transport network, a policy domain marker that identifies a particular network operation policy. The network devices that receive the policy domain marker delineate a region of enforcement for the particular policy. After an appropriate waiting period to permit the selected network devices to advertise their policy domain marker, the system distributes, to all network devices in the intelligent transport network that support control plane signaling or control plane routing, an enforcement signal to enforce the particular network operation policy for the delineated region.

17 Claims, 11 Drawing Sheets

(56) References Cited

U.S. PATENT DOCUMENTS

2012/0089699 A1* 4/2012 Cholas .......................... 709/217
2012/0179810 A1* 7/2012 Contreras Delpiano
              et al. ............................ 709/224
2013/0083725 A1* 4/2013 Mallya et al. ................ 370/328

* cited by examiner

| POLICY MARKER | POLICY TYPE on OTN Layer | POLICY ID | DOMAIN ID | ACTION | REMARK |
|---|---|---|---|---|---|
| PDM-1 | Traffic Management | Policy ID=1 | Domain ID=10 | No transient traffic is allowed in the region | |
| PDM-2 | Maintenance | Policy ID=1 | Domain ID=10 | The region is locked down for maintenance work. | |
| PDM-3 | Protection & Restoration | Policy ID =1 | Domain 1 ID=10 Domain 2 ID=11 .. Domain N ID=xx | Each PDM-3 domain is a dynamic reroute domain for all reroute-protected circuits through the domain. | Must define 2 or more domains |
| PDM-4 | Traffic Management | Policy ID=2 | Domain ID=10 | Same as PDM-1, except certain groups of customers are allowed to trespass the region | |
| PDM-5 | Service Topology | Policy ID=1 | Domain ID=1 | The region is considered as a core network during service provisioning. | |
| PDM-6 | Service Topology | Policy ID=2 | Domain ID=10 | The region is considered as an access network during service provisioning. | |

FIG. 5

NODE MARKING FOR CONTROL PLANE OPERATION

BACKGROUND

Operating procedures for public carrier networks are governed by a set of network engineering and operation policies. Some policies apply to a whole network; while others are defined for parts of the network which include regions, areas, platform domains, and sections. Network operation policies are regularly reviewed by operators, and changes are made to accommodate emerging traffic patterns, new technologies, or customer demands. The scope of a policy may vary for each application. The same policy can be applied to different sections of a global transport network either simultaneously or in different time-frames. In general, network operation policies are established to serve many purposes. Some examples are traffic management, maintenance, security, circuit quality-of-service (QoS), etc.

BRIEF DESCRIPTION OF THE DRAWINGS

FIG. 5 is a table of exemplary network operation and service provisioning policies;

DETAILED DESCRIPTION OF PREFERRED EMBODIMENTS

The following detailed description refers to the accompanying drawings. The same reference numbers in different drawings may identify the same or similar elements.

Systems and methods provided herein provide a network operation policy implementation and enforcement system (NOPS) for a transport carrier network. The systems and methods may implement "policy domains" that identify the coverage scope of particular policies. A policy domain may define a region of a transport network within which a pre-defined policy should be enforced. A region may include, for example, a vendor equipment domain, a control plane routing area, or a cluster of network nodes (e.g., equipment of the same or of different types).

In one implementation, a node marking scheme may be used to identify all transport nodes within a policy region. Control plane routing and signaling mechanisms may use the node markers to identify respective policy domains and boundaries. Given a policy domain (e.g., including particularly marked nodes), network policies may be installed, activated, and/or terminated in a simplified manner for an entire policy domain. After a policy is installed and activated in a network, the control plane's routing, signaling and protection and restoration (P&R) functions may enforce the policy.

Figure 1:
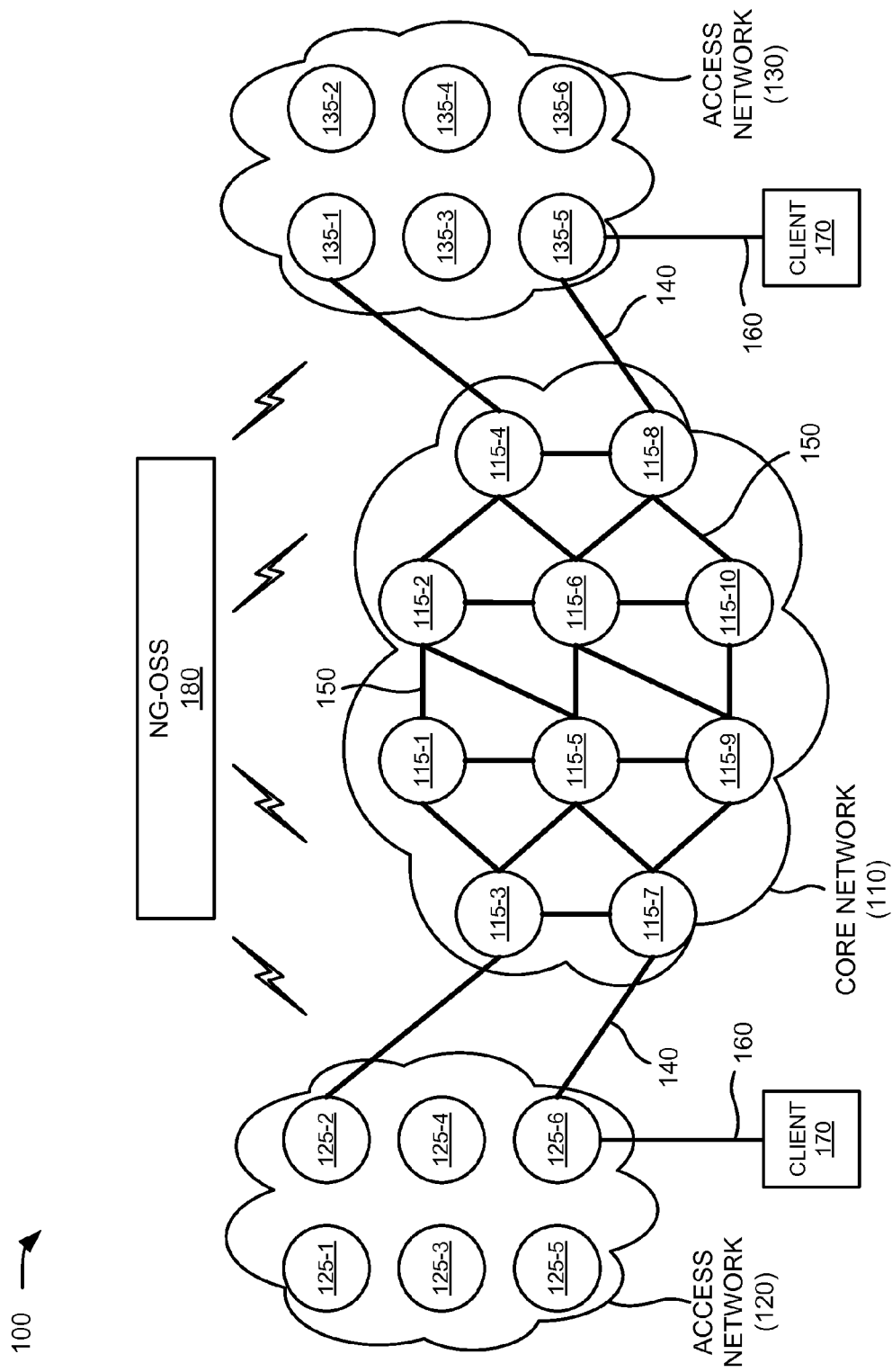
FIG. 1 is a diagram illustrating an exemplary network in which systems and/or methods described herein may be implemented.

FIG. 1 depicts an exemplary network 100 in which systems and methods described herein may be implemented. Network 100 may include a core network 110 interconnecting an access network 120 and an access network 130. Network 110 may include multiple nodes 115-1 through 115-10 (referred to herein collectively as "nodes 115" and generically as "node 115"). Similarly, access network 120 may include multiple nodes 125-1 through 125-6 (referred to herein collectively as "nodes 125" and generically as "node 125"), and access network 130 may include multiple nodes 135-1 through 135-6 (referred to herein collectively as "nodes 135" and generically as "node 135"). As used herein, the term "node" may refer to a network device, such as a router, switch, gateway, etc. As described further below, nodes 115/125/135 may be connected by links 140/150/160 which may be used to form a communication path between, for example, clients 170. The amount of networks, nodes, and links in FIG. 1 has been illustrated for simplicity. In practice, there may be more or fewer networks, nodes, and/or links.

In implementations herein, each of networks 110, 120, and 130 represents a new generation of intelligent transport network (NG-ITN). A NG-ITN generally includes a high-level intelligence offered by a transport control plane (CP), which is either embedded in network nodes (e.g., nodes 115/125/135) or implemented on separate entities with interfaces to the network nodes, such as path computation engines (PCE, not shown). As described further herein, the NG-ITN control plane may be capable of automating routing and signaling operations for all transport networks. A new generation operation support system (NG-OSS) 180 may be used to effectively manage the NG-ITN. NG-OSS 180 may include a device, or group of devices, capable of supporting one or more control planes in an NG-ITN that provides design and/or routing of end-to-end circuits (or circuits within a domain) and dynamic provisioning of protection for those circuits. The NG-OSS 180 may be implemented, for example, as a distributed component within some or all of nodes 115/125/135.

As defined by international standards bodies, a control plane architecture framework may be defined by three network interfaces: an external network to network interface (E-NNI), an internal-network to network interface (I-NNI), and/or a User Network Interface (UNI). An E-NNI (e.g., interfaces on link 140) may provide a demarcation point that supports cross-domain connection provisioning (e.g., intra-carrier/inter-domain (trusted) connections and/or inter-carrier (un-trusted) connections), and may provide signaling with limited routing information exchanges. An I-NNI (e.g., interfaces on link 150) may provide an intra-domain (trusted) node-to-node interface that supports control plane functions, and may provide intra-domain signaling and/or routing functions. A UNI (e.g., interfaces on link 160) may provide a demarcation point between users and a network, may be an un-trusted interface, and may provide signaling capabilities to the users.

The intelligent control plane may support, for example, auto-discovery and self-inventory of network resources, topology, and connection map; end-to-end path calculations subject to traffic engineering constraints; dynamic end-to-end path setup and teardown in a single-step and single-ended fashion; and supports a variety of protection and restoration schemes. Deployment of the intelligent control plane may provide for improved network efficiency, enhanced network resiliency, and new revenue opportunities. However, an intelligent policy-aware control plane may be difficult to implement based on legacy control plane standards, as the legacy control plane standards do not support or facilitate the executions of network operation policies. A new generation of transport control plane (NG-CP) is described herein to facilitate flexible and fast execution of network operation policies.

Figure 2A:
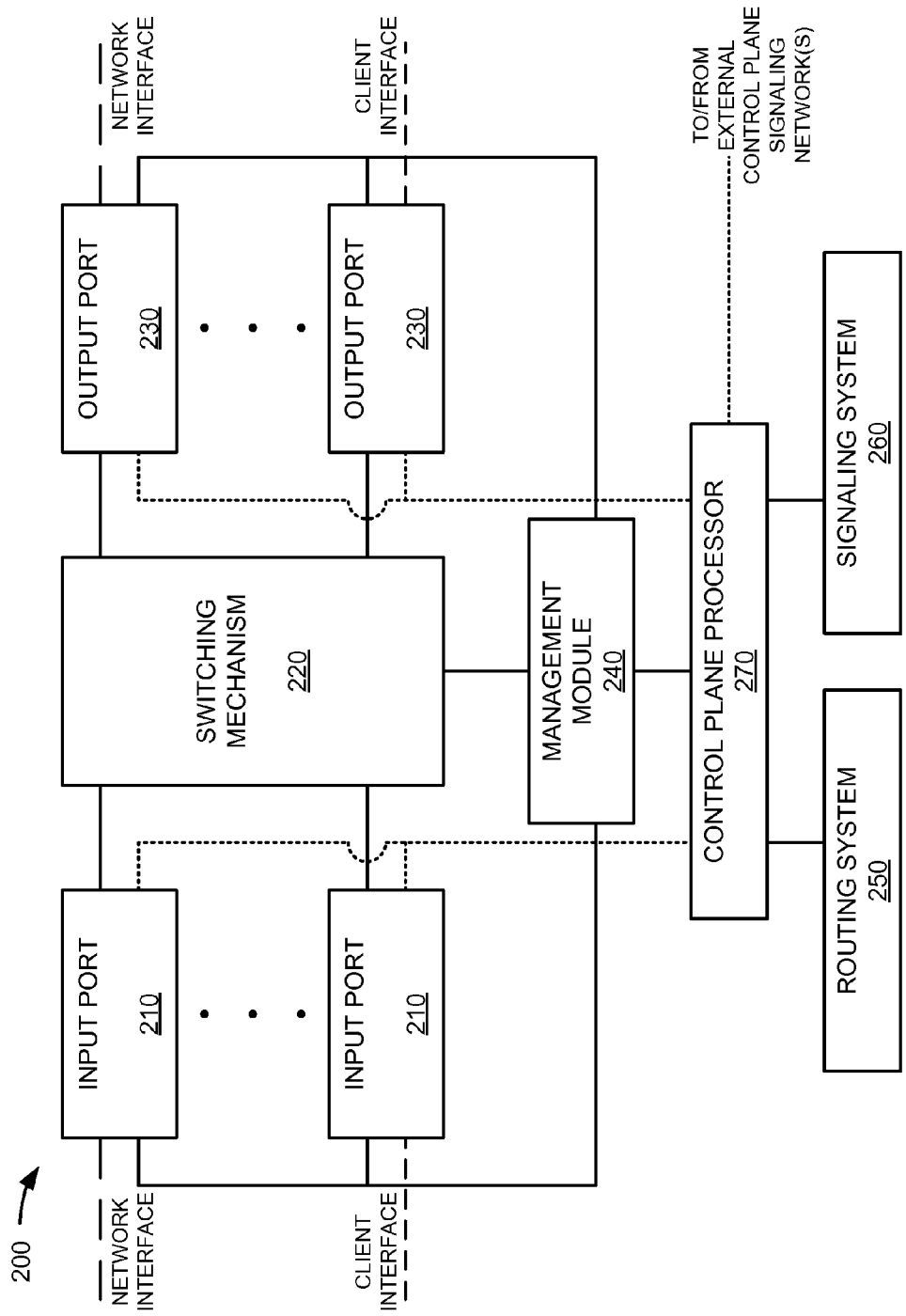
FIG. 2A is a block diagram illustrating exemplary components of a device that may correspond to one of the nodes of FIG. 1.

FIG. 2A is an exemplary diagram of a device 200 that may correspond to one of nodes 115, 125, or 135. Nodes 115, 125, or 135 may be generically referred to hereinafter as a node 200 or device 200. Device 200 may include input ports 210, a switching mechanism 220, output ports 230, a management module 240, a routing system 250, a signaling system 260, and/or a control plane processor 270.

Generally, input ports 210 may be the point of attachment for a physical link (not shown) and may be the point of entry for incoming client traffic, network transit traffic, and control plane messages. Input ports 210 may carry out service adaptation, datalink layer encapsulation and decapsulation. Input ports 210 may look up a destination address of incoming traffic in a forwarding table to determine its destination port (i.e., route lookup). In order to provide quality of service (QoS) guarantees, input ports 210 may classify traffic into predefined service classes. Input ports 210 may run optical layer framing protocols, datalink-level protocols, or network-level protocols. Input ports 210 may also perform demultiplexing time slots and/or wavelengths over physical interfaces, and send the demultiplexed traffic streams to switching mechanism 220 for cross-connecting to proper output ports 230.

Switching mechanism 220 may connect input ports 210 with output ports 230. Switching mechanism 220 may be implemented using many different techniques. For example, switching mechanism 220 may include busses, crossbars, shared memories, a space-division switch, a time-division-multiplexing switch, and/or a wavelength selection switch. A simple switching mechanism 220 may be a bus that may link input ports 210 and output ports 230. A crossbar may provide multiple simultaneous data paths through switching mechanism 220. In a shared-memory switching mechanism 220, incoming traffic may be stored in a shared memory and pointers to traffic may be switched.

Output ports 230 may store traffic before the traffic is transmitted on an output link (not shown). Output ports 230 may use/implement scheduling algorithms that support priorities and guarantees. Output ports 230 may support datalink layer encapsulation and decapsulation, and/or a variety of higher-level protocols. Traffic for output ports 230 may include, for example, either terminating traffic to client ports or network transit traffic. Output ports 230 may support optical transport over different optical media in many possible multiplexing formats, e.g., time-slot multiplexing, frequency multiplexing, and wavelength multiplexing.

Management module 240 may connect with input ports 210, switching mechanism 220, output ports 230, and control plane processor 270. Management module 240 may communicate with other nodes (e.g., nodes implementing NG-OSS 180) and may perform provisioning, configuration, reporting, and/or maintenance functions for node 200. In one implementation, management module 240 may also compute a forwarding table(s), implement routing protocols, and/or run software to configure and/or manage device 200. Additionally, management module 240 may interface with control plane processor 270 to manage/supervise control plane processor 270. Additional details of management module 240 are provided below in connection with FIG. 2B.

Control plane processor 270 may connect with input ports 210, output ports 230, management module 240, routing system 250, and signaling system 260. Control plane processor 270 may process all incoming and outgoing control plane messages, which are collected from input ports 210 and/or output ports 230 (e.g., for control plane messages embedded in network traffic streams) and from external control plane message networks (e.g., received directly at control plane processor 270).

Two major components of a transport control plane are routing and signaling. Routing system 250 may handle any traffic whose destination address may not be found in forwarding tables. Routing system 250 may include a routing engine or protocol processor, routing tables, etc. Routing system 250 may, for example, distribute/exchange routing messages with other devices 200. Signaling system 260 may activate paths between particular nodes and/or may implement signaling protocols for device 200.

Control plane processor 270 may be responsible for coordinating functions of routing system 250 and signaling system 260. Routing system 250 and signaling system 260 may generally be configured to support a NG-CP's policy capabilities. Most traffic management and network maintenance policies will rely on policy-enhanced routing functions performed, for example, by routing system 250. Service topology and security policies may mostly involve non-routing signaling functions performed, for example, by signaling system 260.

Although FIG. 2A shows exemplary components of device 200, in other implementations, device 200 may contain different, fewer, or additional components than depicted in FIG. 2A. For example, in one implementation, one or more components of device 200 depicted in FIG. 2A may perform the tasks performed by other components of device 200. Although FIG. 2A shows device 200 as including routing system 250 (i.e., a distributed routing system for a network), in other implementations, a centralized routing system may be provided for a network and routing system 250 may be omitted from device 200.

Figure 2B:
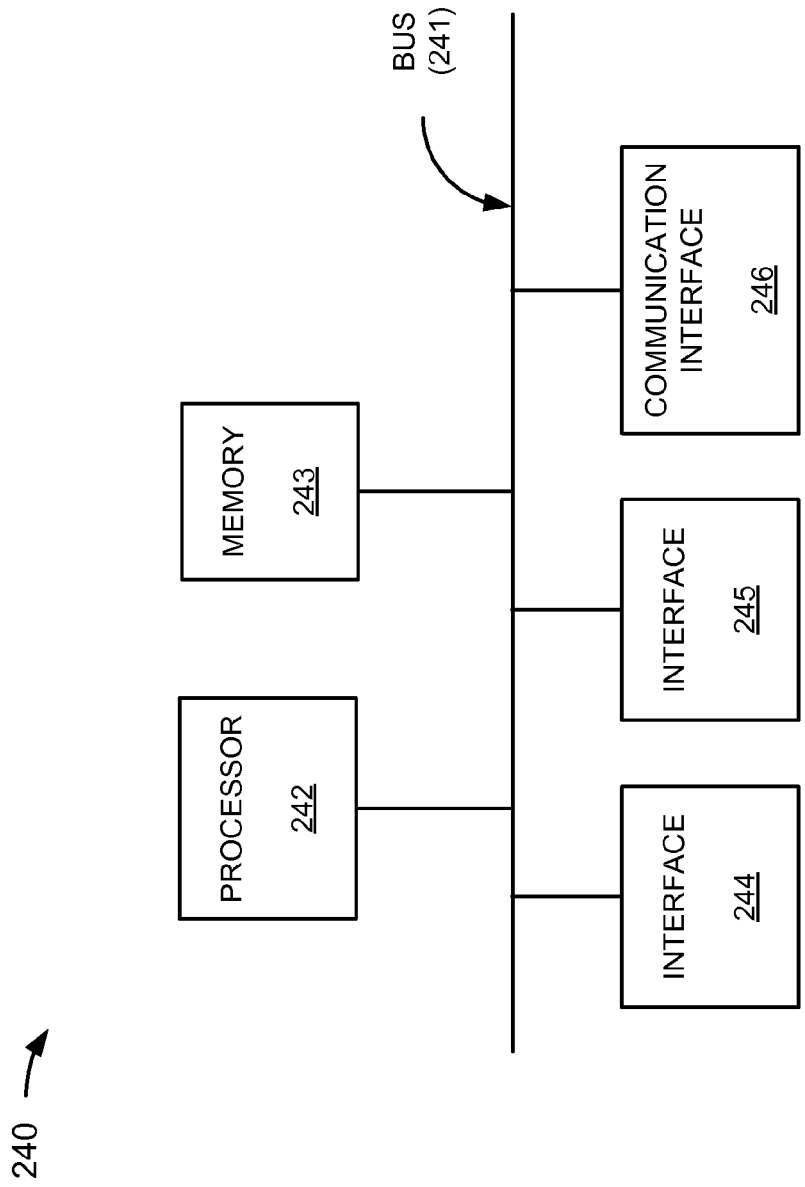
FIG. 2B is a block diagram illustrating exemplary components of the components of the device of FIG. 2A.

FIG. 2B is an exemplary diagram of a device that may correspond to management module 240 of device 200. Management module 240 may be implemented, for example, as a network card within device 200. As shown, management module 240 may include a bus 241, a processor 242, a memory 243, an interface 244 for input ports 210, an interface 245 for output ports 230, and a communication interface 246. Bus 241 may include a path that permits communication among the components of management module 240.

Processor 242 may include a processor or microprocessor that may interpret and execute instructions, such as instructions from an external source. Memory 243 may include a random access memory (RAM) or another type of dynamic storage device that may store information and instructions for execution by processor 242. Interfaces 244 and 245 may include a mechanism that permits interconnection with input ports 210 and output ports 230, respectively. Communication interface 246 may include any transceiver-like mechanism that enables management module 240 to communicate with other devices and/or systems, either internal or external. For example, communication interface 246 may include mechanisms for communicating with other devices 200 or other components of device 200, such as switching mechanism 220.

As will be described in detail below, management module 240 may perform certain operations to implement node marking for an intelligent transport network. Management module 240 may perform these operations in response to processor 242 executing software instructions contained in a computer-readable medium, such as memory 243. A computer-readable medium may include a non-transitory memory device. A memory device may be implemented within a single physical memory device or spread across multiple physical memory devices.

The software instructions may be read into memory 243 from another computer-readable medium or from another device via communication interface 246. The software instructions contained in memory 243 may cause processor 242 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2B shows exemplary components of management module 240, in other implementations, management module 240 may contain different, fewer, or additional components that may provide a network operation policy mechanism for control-plane-enabled networks. In still other implementations, one or more components of management module 240 may perform the tasks performed by other components of management module 240.

Figure 3:
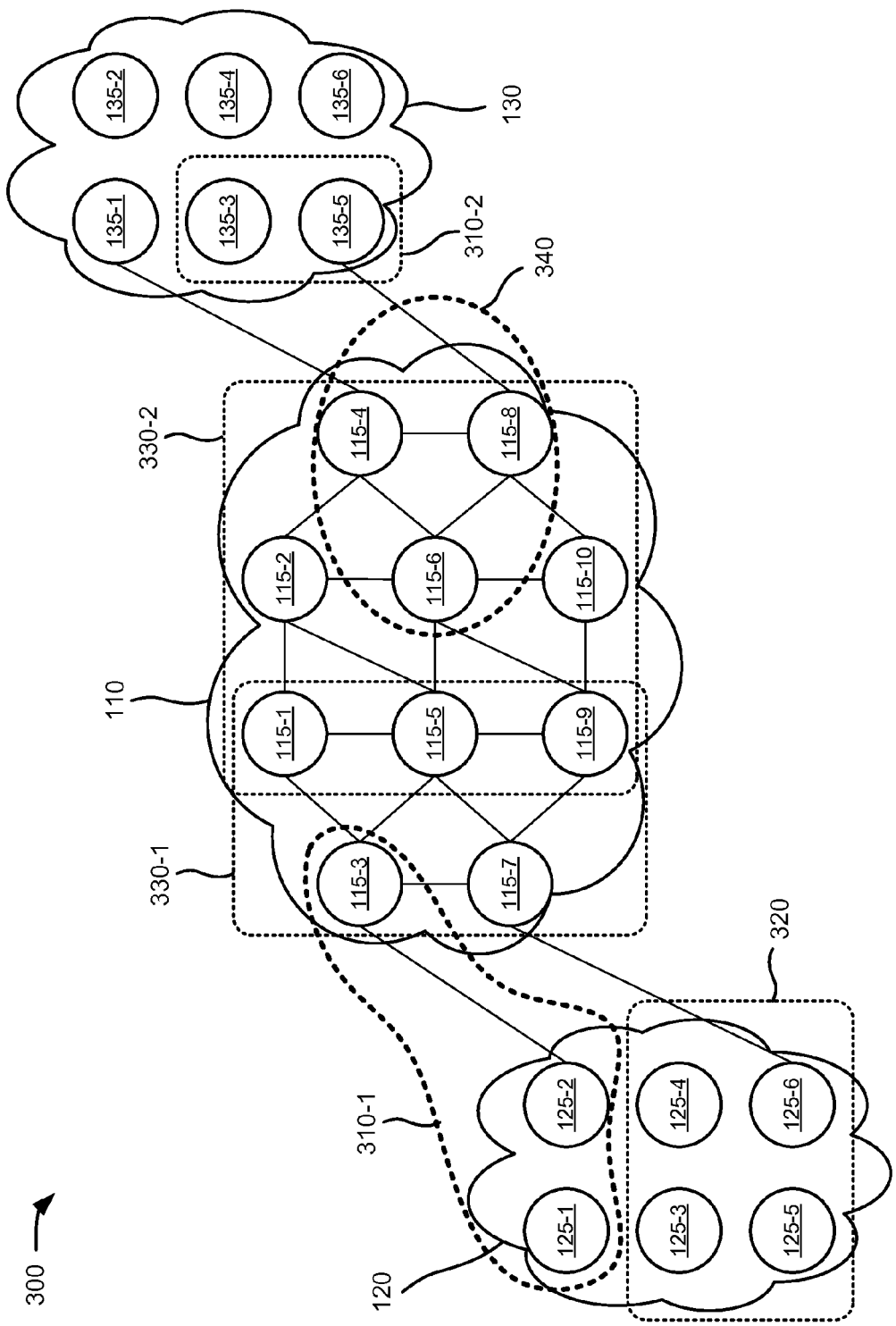
FIG. 3 is a diagram illustrating an exemplary set of policy domains in the network of FIG. 1.
Figure 4:
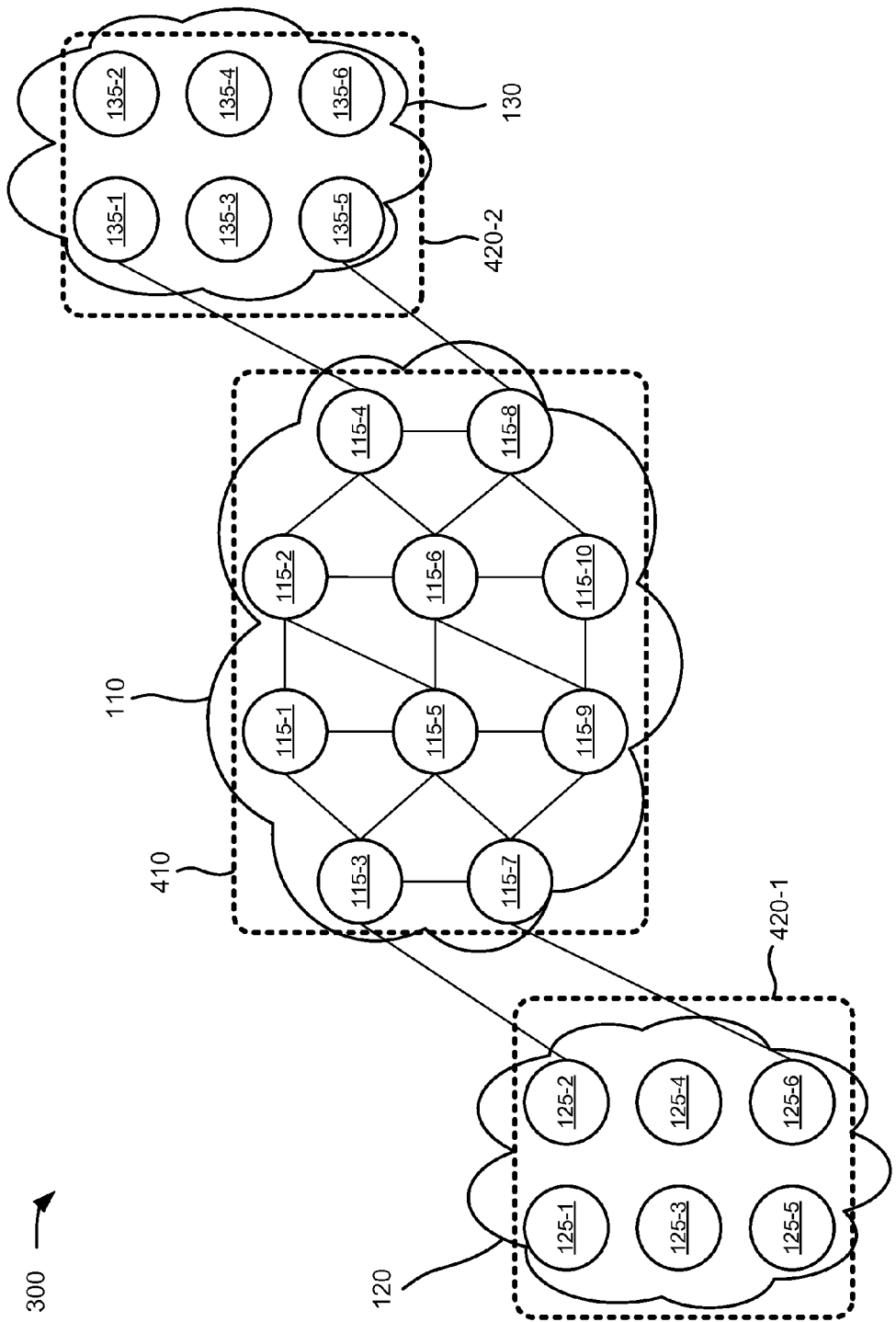
FIG. 4 is a diagram illustrating another exemplary set of policy domains in the network of FIG. 1.

FIGS. 3 and 4 are diagrams illustrating exemplary policy domains in a portion 300 of network 100. Network portion 300 may include core network 110, access network 120, and access network 130. Core network 110, access network 120, and access network 130 may include three domains together forming a carrier ITN. In this example, access network 120 may be a domain for a first vendor; access network 130 may be a domain for a second vendor; and core network 110 may be a third vendor's long haul backbone core network. As shown in FIG. 3, network portion 300 may include four types of policy domains, including a traffic management—type 1 domains 310-1 and 310-2, a maintenance domain 320, restoration domains 330-1 and 330-2, and a traffic management—type 2 domain 340. Referring to FIG. 4, network portion 300 may also include two other types of policy domains, including a service topology—core network domain 410 and two service topology—access network domains 420-1 and 420-2. Each node 115/125/135 may belong to multiple policy domains. Furthermore, policy domains can be nested or overlapped.

As shown in FIG. 3, traffic management—type 1 domain 310-1 may include nodes 115-3, 125-1, and 125-2. Traffic management—type 1 domain 310-2 may include nodes 135-3 and 135-5. Maintenance domain 320 may include nodes 125-3 through 125-6. Restoration domain 330-1 may include nodes 115-1, 115-3, 115-5, 115-7 and 115-9. Restoration domain 330-2 may include nodes 115-1, 115-2, 115-4, 115-5, 115-6, 115-8, 115-9, and 115-10. Traffic management—type 2 domain 340 may include nodes 115-4, 115-6, and 115-8. As shown in FIG. 4, service topology—core network domain 410 may include all nodes 115 in core network 110. Service topology—access network domain 420-1 may include all nodes 125 in access network 120, and service topology—access network domain 420-2 may include all nodes 135 in access network 130.

Generally, a node marking scheme may be used to identify all transport nodes (e.g., any of nodes 115/125/135) within a policy region. For any policy and its regions of coverage, each node within the regions may be assigned a node-level, layer-specific policy domain marker (PDM). The PDM may carry at least five parameters: (a) policy type, (b) policy ID, (c) domain ID, (d) technology layer of application, and (e) routing level or level of distribution. These parameters are described further in connection with FIG. 5. Other parameters can be defined as needed to carry policy-specific attributes.

FIG. 5 provides a table 500 of exemplary network operation and service provisioning policies. In the example of FIG. 5, all policy types relate to one transport layer of an integrated transport network (ITN) at routing level of 0. In other implementations, table 500 may include additional fields to indicate different layers and routing levels. As shown in FIG. 5, table 500 may include a policy marker field 510, a policy type on optical transport network (OTN) layer field 520, a policy ID field 530, a domain ID field 540, an action field 550, a remark field 560, and a variety of records or entries 570 associated with fields 510-560. Policy marker field 510 may include a unique identifier for a policy marker (e.g., "PDM-1").

The policy type parameter in field 520 may specify operator-defined policy types (e.g., "Traffic Management"). In general, network operation policies can be classified into certain types, such as (without limitation) traffic management, maintenance, protection and restoration (P&R), service topology, security, etc. A traffic management policy, for example, may perform specific actions on traffic related to a region in the network, i.e., traffic originated, terminated, or passing through the region. A maintenance policy may specify preparatory actions to be performed for a region within which maintenance work will be conducted such that live traffic in the region will not be disturbed. A security policy may define security schemes, such as security protocols, already implemented or to be instantiated within a network region. A P&R policy may specify the scope of a particular protection and restoration mechanism implemented in a network. A service topology policy may specify regions in a network within which service provisioning for each circuit will be processed differently from other regions.

The policy identifier field 530 may identify a particular variation of a policy (e.g., "Policy ID=1"). For a given policy type, there could be policies of different variation in terms of, for example, criteria for actions and actions to be performed. The policy identifier parameter can be used to identify a particular policy variation to be enforced.

The domain identifier field 540 may identify a particular implementation scope of a policy (e.g., "Domain ID=10"). For a given policy, as designated by the policy identifier, the domain identifier parameter can be used to identify a particular region of coverage for the policy. It should be noted that any policy can be applied to different regions within a network during the same time frame.

Action field 550 and remark field 560 are included in table 500 to provide a high-level description of network operation and service provisioning policies. However, these fields do not include actual PDM parameters. Action field 550 may be used to define or describe the action invoked by the corresponding policy marker in policy marker field 510. Remark field 560 may be used to include additional information. Although not shown in FIG. 5, table 500 may also include a separate technology layer of application field. The technology layer of application field may specify a transport technology layer, such as SONET/SDH, OTN, Ethernet, etc. on which a policy will be enforced.

In some implementations, table 500 may also include a separate routing level field (e.g., in contrast with having the entire table 500 dedicated to a particular routing level, as indicated by field 520 of FIG. 5). The routing level may specify a level for PDM distribution within a routing information hierarchy. When the routing database of an ITN is structured as a multi-level hierarchy to achieve scalability, this PDM parameter is used to inform the ITN on which hierarchical level the PDM should be distributed. Examples of hierarchical routing topology databases can be found in international standards, such as Optical Internetworking Forum (OIF) E-NNI routing standards, Open Shortest Path First (OSPF) v2 standards, and Asynchronous Transfer Mode (ATM) Private Network-to-Network Interface (PNNI) standards. In general, the lowest routing level (e.g., Level 0) may represent a local distribution scope (e.g., the most restrictive distribution scope).

Each PDM assigned to a node is distributed on its routing level along with other local routing attributes, such as the link state attributes disseminated by link state advertisements (LSAs) in the OSPF-TE routing procedure. Two PDMs can be considered identical if they share the same policy type (e.g., from field 520 of table 500), policy identifier (e.g., from field 530), technology layer, and routing level. The same policy and PDM can be applied to different domains on the same technology layer over the same routing level. Given the above, it can be said that each PDM uniquely defines a specific policy, and the policy domain for "PDM-X" (e.g., from field 510) should be a region of the network (e.g., network 100) that consists of all network nodes 115/125/135 assigned with the PDM-X.

Node marking by PDM is an effective way to identify regions of coverage for various types of network operation and service policies by a transport control plane. With a PDM assigned to all nodes in a policy domain, control plane routing and signaling mechanisms are able to identify its policy domain and boundary. This allows the control plane to support on-demand policy installation and enforcement over selected network regions.

The policy domains illustrated in FIGS. 3 and 4 and the network operation and service provisioning policies summarized in FIG. 5 are for illustrative purposes. In practice, there may be additional, different, or fewer policy domains and/or policies.

Figure 6:
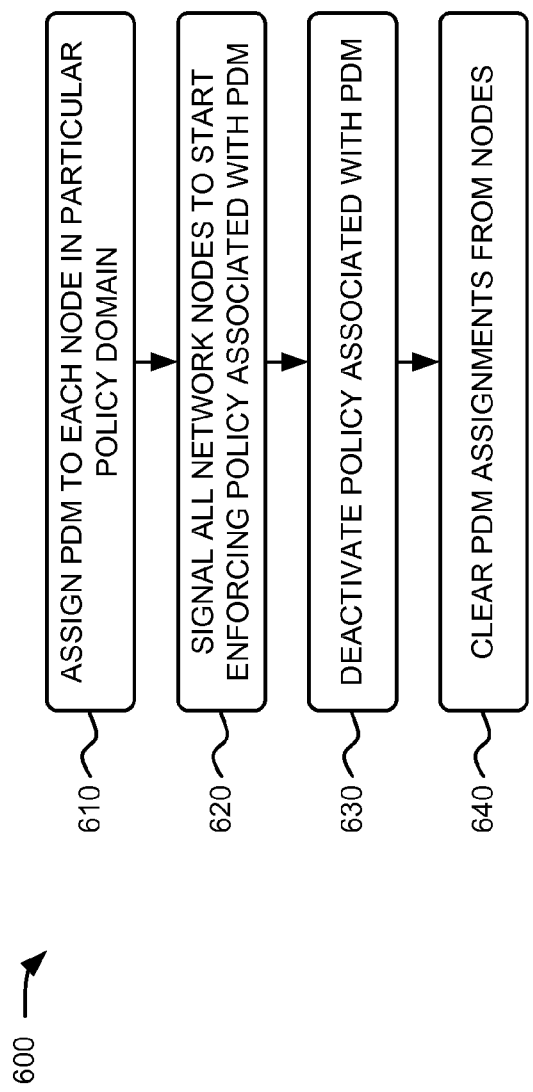
FIG. 6 is a flow diagram of an exemplary process for installing, activating, and terminating network policies according to an implementation described herein.

FIG. 6 is a flow diagram of an exemplary process 600 for installing, activating, and terminating network policies according to an implementation described herein. Generally, network operators are responsible for installation, activation and termination of network policies, for example, via scripts and/or programs. The procedure for these operations is greatly simplified using the node marking according to implementations described herein. Referring to FIG. 6, process 600 may include assigning a PDM to each node in a particular policy domain (block 610). For example, network operators may mark each node in pre-selected policy domains with a pre-defined PDM (e.g., "PDM-X") marker. Process block 610 can be carried out by using NG-OSS 180, or any management plane equivalent, to send PDM setting commands to all nodes in the policy domains. The command syntax can be determined, for example, according to vendor-specific management plane/node interfaces. In one implementation, PDMs may be assigned automatically using scripts. For example, PDM assignments may be accomplished as a scripted change (e.g., using Perl scripting or another programming language). Nodes that receive the PDM may inform other nodes in the carrier transport network (e.g., network 100) via appropriate signaling messages. In other implementations, manual operations may be used to assign PDMs to particular nodes.

Process 600 may also include signaling all network nodes to start enforcing a policy associated with the PDM (block 620). For example, network operators can inform all network nodes that support control plane routing and/or signaling to start enforcing "PDM-X" in all path computation, signaling, and restoration activities. In one implementation, operators may insert a wait-time between process block 610 and process block 620 to allow the information of new policy domains to be distributed (e.g., via routing advertisements or another mechanism to communicate a node's local routing topology) to all network nodes. In another implementation, when new regions are to be added to an installed policy, only process block 610 needs to be performed.

Process 600 may also include deactivating the policy associated with the PDM (block 630). For example, network operators may inform all network nodes that are enforcing "PDM-X" to turn off and terminate the policy. The termination instruction can be sent by NG-OSS 180 or other management plane entities.

Process 600 may further include clearing the PDM assignments from the nodes (block 640). For example, PDM-removing commands may be sent to all nodes in "PDM-X" domains to remove the "PDM-X" markers on the nodes. No wait interval would be needed between process block 630 and process block 640.

After a policy is installed and activated in a policy domain, the control plane's routing, signaling, and protection and restoration (P&R) functions are responsible for enforcing the policy. Depending on the type of a policy, different control plane functions (e.g., routing, signaling, P&R, or a combination of these functions) may be involved to enforce the policy. A new generation of transport control plane (NG-CP) is used to support policy execution in the NOPS environment. A NG-CP is an enhanced version of conventional transport control plane, which has been standardized by the OIF, the IETF, and the International Telecommunication Union (ITU). The NG-CP may differ from the conventional transport control plane in its capabilities to (a) interface with management plane or OSS on all policy related transactions, (b) interface with management plane or policy servers to fetch policies to be enforced, (c) parse and translate policies into executable logic, (d) identify regions in which a policy is to be enforced, and (e) to handle dependency and interactions between policies.

Figure 7:
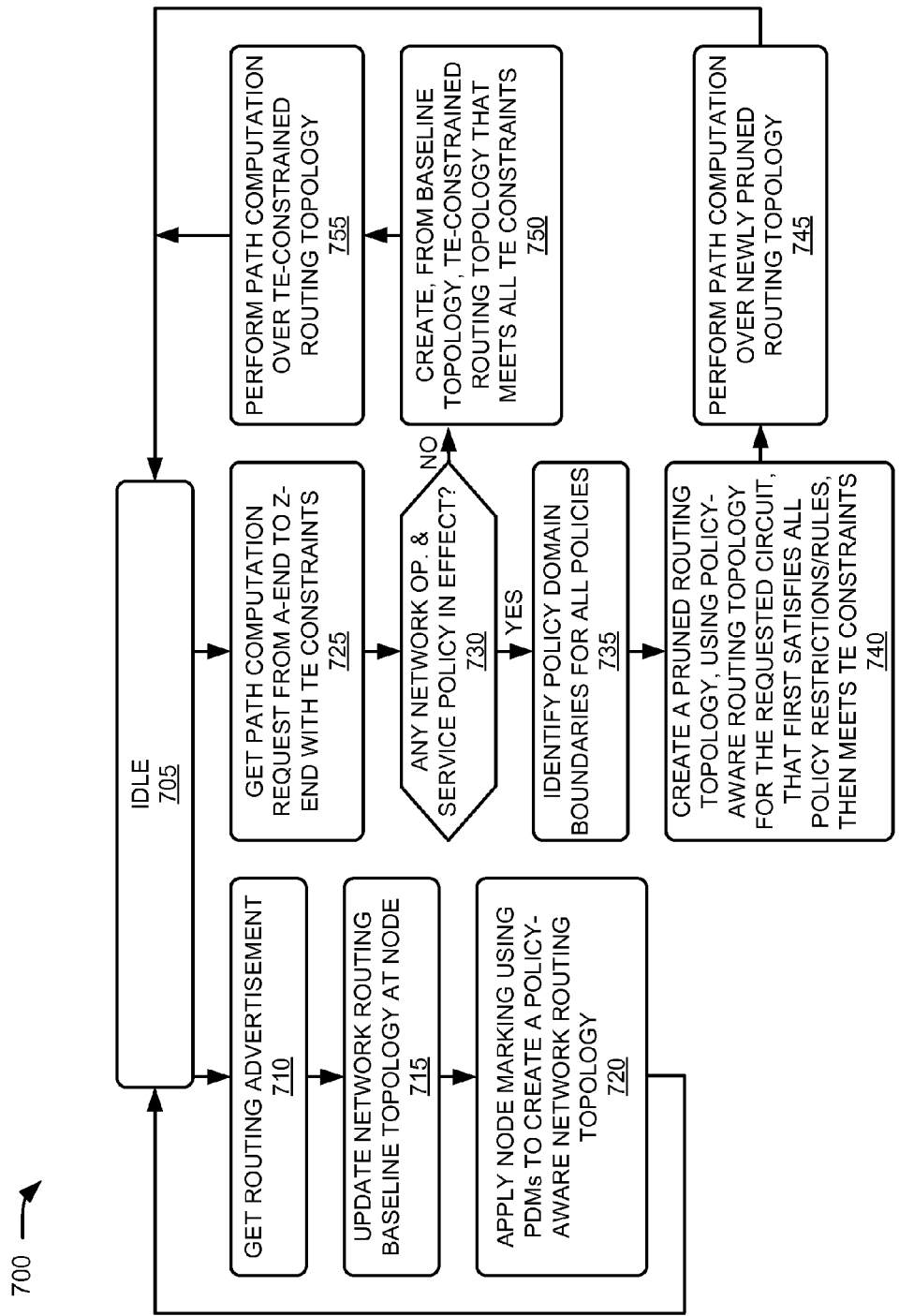
FIG. 7 is a flow diagram of an exemplary process for performing routing and path computation functions according to an implementation described herein.

FIG. 7 is a flow diagram of an exemplary process 700 for performing routing and path computation functions according to an implementation described herein. Process 700 may be performed by a device 200. In another implementation, some or all of process 700 may be performed by another device or group of devices, including or excluding device 200. For example, a PCE or a network management device in network 100 may perform one or more parts of process 700.

As shown in FIG. 7, process 700 may start with a node in an idle state (block 705), and may include obtaining a routing advertisement (block 710), updating a network routing topology (block 715), and applying node marking using PDMs to create a policy-aware network routing topology (block 720). For example, a node 200 may receive, from another node, a router discovery message with one or more PDMs. Node 200 may add the new nodes to the routing baseline, and may use the PDMs (e.g., from the routing advertisement) to associate the new nodes with a policy domain.

Process 700 may also include obtaining a path-computation request from an A-end to a Z-end with traffic engineering (TE) constraints (block 725), and determining if any network operation and service policy is in effect (block 730). For example, node 200 may receive a path-computation request that indicates a source and destination. The request may include TE parameters carried by, for example, the MPLS/GMPLS LSP setup signaling protocol. Node 200 may scan a table or memory component (e.g., routing system 250) to determine if any operation and service policies are currently in effect.

If any network operation and service policy is in effect (block 730—YES), process 700 may include identifying policy domain boundaries for all policies (block 735), creating a pruned routing topology, using policy-aware routing topology for the requested circuit, that first satisfies all policy restrictions and/or rules, then meets TE constraints (block 740) for the requested circuit, and performing a path computation over the newly pruned routing topology (block 745). For example, node 200 (e.g., routing system 250) may identify policy domain boundaries based on policy domain markers received from OSPF-TE advertisements. Node 200 may create a pruned (or modified) routing topology that satisfies both the network operation and service policy and the traffic engineering constraints. Node 200 may then perform a path computation, for the path computation request, using the modified routing topology.

If no network operation and service policy is in effect (block 730—NO), process 700 may include creating a TE-constrained routing topology that meets all TE constraints (block 750), and performing a path computation over the TE-constrained routing topology (block 755). For example, node 200 (e.g., routing system 250) may create routing topology that satisfies the traffic engineering constraints (e.g., without regard for policy constraints). Node 200 may then perform a path computation, for the path computation request, using the non-policy-specific routing topology.

Figure 8:
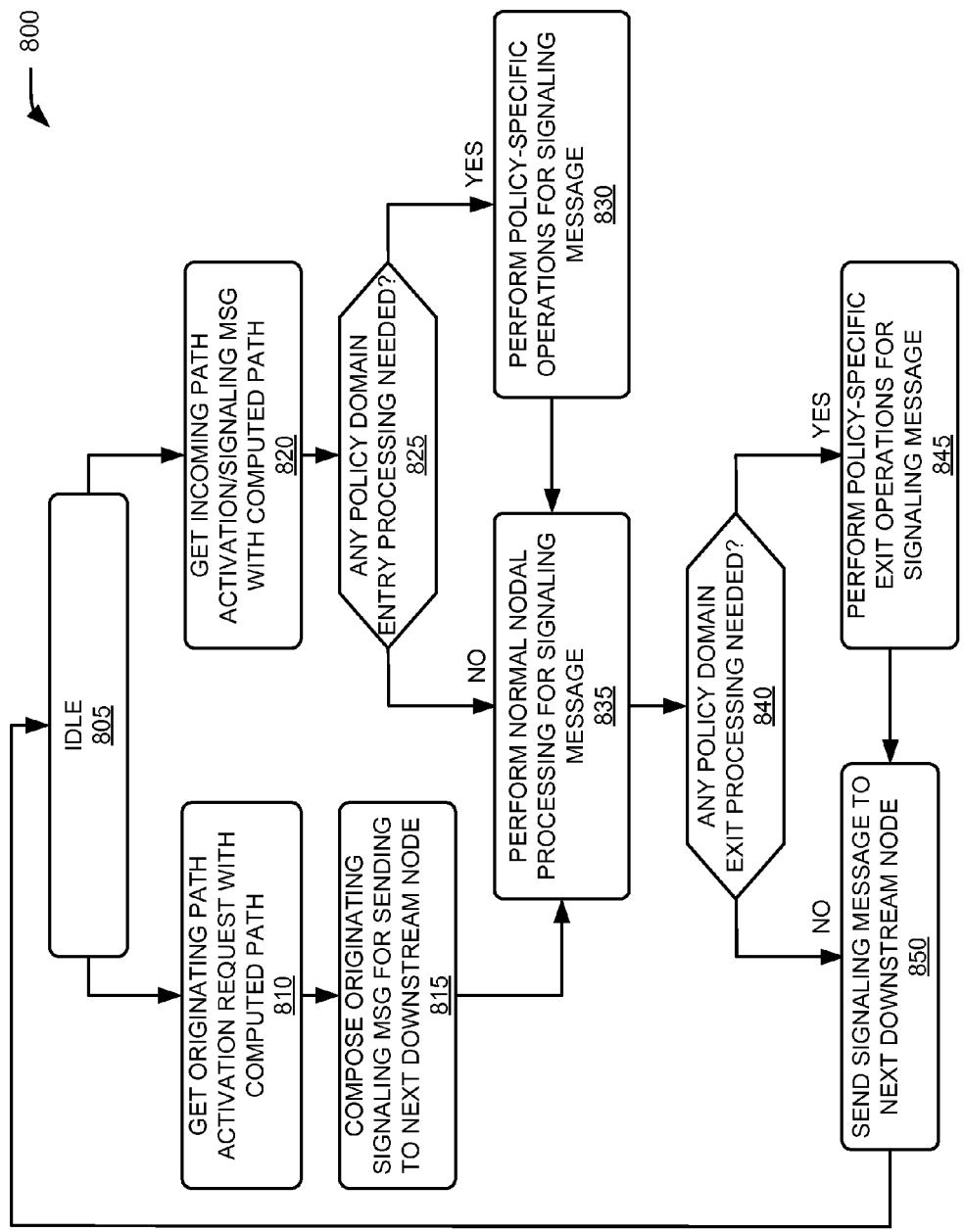
FIG. 8 is a flow diagram of an exemplary process for performing signaling functions according to an implementation described herein.

FIG. 8 is a flow diagram of an exemplary process 800 for performing signaling functions according to an implementation described herein. Process 800 may be performed by a device 200. In another implementation, some or all of process 800 may be performed by another device or group of devices, including or excluding device 200. For example, a PCE or a network management device in network 100 may perform one or more parts of process 800.

As shown in FIG. 8, process 800 may start with a node in an idle state (block 805). Process 800 may include obtaining an originating path activation request with a computed path (block 810), and composing an originating signaling message for sending to the next downstream node (block 815). For example, node 200 (e.g., signaling system 260) may receive a path activation request and compose a signaling message to a next downstream node 200 to start provisioning and activating an end-to-end path.

Process 800 may include obtaining an incoming path activation and/or signaling message with a computed path (block 820), and determining if any policy domain entry processing is needed (block 825). For example, after receiving advertisements indicating assignment of a policy domain marker to devices in the intelligent transport network and detecting a boundary for a policy domain based on the advertisements, node 200 (e.g., signaling system 260) may receive an incoming path activation message with a computed path. Node 200 may detect an initial entry of the path activation message into the policy domain (e.g., based on the determined boundary and the upstream node), and may determine if processing is required based on entry of the signal into the policy domain.

If domain entry processing is needed (block 825—YES), process 800 may include performing policy-specific operations for the signaling message (block 830). For example, node 200 (e.g., signaling system 260) may apply a service topology policy (or another type of policy) to provision a path.

After policy-specific operations are performed (block 830), or if no domain entry processing is needed (block 825—NO), or after composing an originating signaling message for sending to the next downstream node (block 815), process 800 may include performing normal nodal processing for the signaling message (block 835). For example, if node 200 (e.g., signaling system 260) identifies that a signaling message did not just enter a policy domain (e.g., either because it originated at node 200 or because no domain entry processing is required), node 200 may perform non-policy-specific processing to activate a flow path. Similarly, if node 200 has already performed policy-specific processing, node 200 may then proceed with non-policy-specific processing.

Process 800 may also include determining if any policy exit processing is needed (block 840). For example, node 200 (e.g., signaling system 260) may detect a pending exit of the path activation message from the policy domain (e.g., based on the determined policy domain boundary and the downstream node), and may determine if processing is required based on the signal exiting the policy domain.

If policy exit processing is needed (block 840—YES), process 800 may include performing policy-specific exit operations for the signaling message (block 845). For example, node 200 (e.g., signaling system 260) may apply a service topology policy (or another type of policy) to provision a path out of the policy domain.

If no policy exit processing is needed (block 840—NO) or after performing policy-specific exit operations for the signaling message (block 845), process 800 may include sending the signaling message to the next downstream node (block 850). For example, node 200 (e.g., signaling system 260) may forward the signaling message to another node (e.g., either within or outside the policy domain).

The node marking, routing and signaling procedures presented in above (e.g., in connection with FIGS. 6-8) can be implemented in a network in different combinations using a management plane and OSS (MP-OSS) and/or network elements and a control plane (NE-CP). For example, as depicted in Table 1 below, procedures may be implemented in a distributed, centralized, or hybrid manner. Selections of a distributed, centralized, or hybrid implementation may be influenced by trade-offs between the distributed, centralized, and hybrid manners. Factors to consider may include network coverage of the control plane, current functional partitioning between a management plane and control plane, and a service portfolio.

TABLE 1

Implementation Approaches of NOPS

| Implementations | Node Marking | Routing | Signaling |
|---|---|---|---|
| Distributed | MP-OSS | NE-CP | NE-CP |
| Centralized | MP-OSS | MP-OSS | MP-OSS |
| Hybrid | MP-OSS | MP-OSS | NE-CP |

Figure 9:
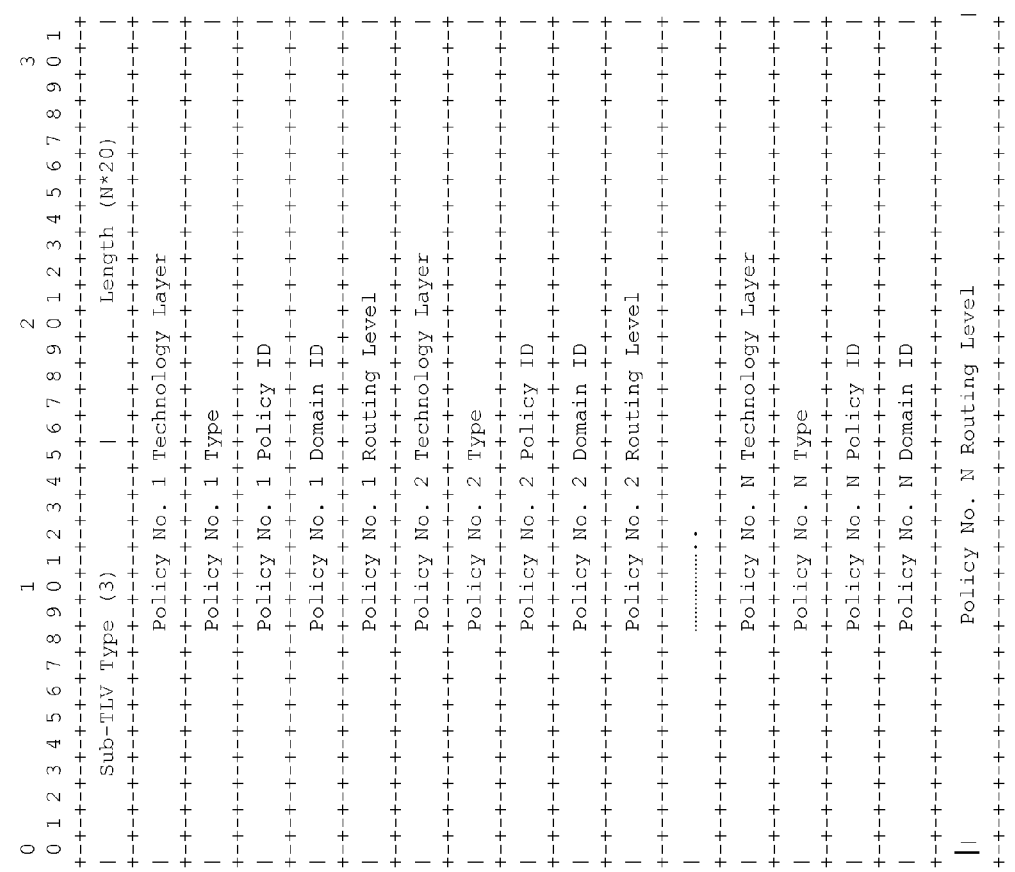
FIGS. 9 and 10 are example formats for implementing node marking using extensions to Internet Engineering Task Force (IETF) Generalized Multi-Protocol Label Switching (GMPLS) protocols.
Figure 10:
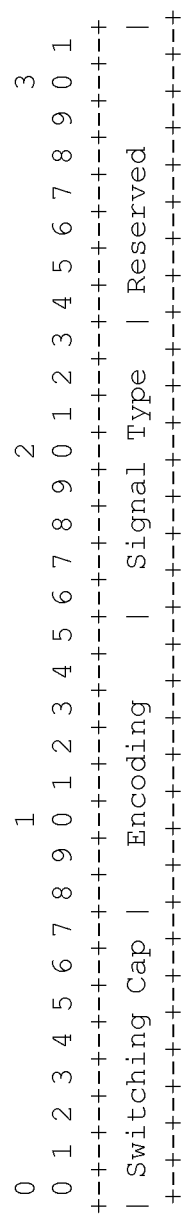

FIGS. 9 and 10 relate to a particular example for using the node marking method and procedure to implement the policies outlined in FIG. 5. Since the majority of current control planes use IETF GMPLS protocols (e.g., OSPF-TE for routing and RSVP-TE for signaling), a practical way to implementing node marking, according to an implementation, is to generate extensions to existing GMPLS protocols. For example, a Local-Node-Policy sub-TLV (e.g., the Type, Length, and Value-tuple) may be defined for use in the OSPF-TE's Node Attribute TLV (e.g., as described in Request for Comments (RFC) 5786 and RFC 5787). The Node Attribute TLV as specified in OSPF-TE guidelines is of type 5 top-level TLV and currently can hold the following four types of sub-TLVs:

TABLE 2

Sub-TLVs defined in a Top-level Node Attribute TLV

| Sub-TLV Type value | Sub-TLV | Semantics (per OIF extensions) | Optional/ Mandatory |
| --- | --- | --- | --- |
| 5 | Local TE Router ID sub-TLV | Identifies the Node to which the Top-level Node Attributes (TNAs) are attached. | Mandatory |
| 1 | Node IPv4 Local Address sub-TLV | Specifies IPv4 TNAs | At least one of the Node IPv4/IPv6 Local Address or NSAP TNA sub-TLVs must be present. |
| 2 | Node IPv6 Local Address sub-TLV | Specifies IPv6 TNAs | |
| 32772 | NSAP TNA Address Sub-TLV | Specifies NSAP TNAs | |

According to an exemplary implementation, a new Local-Node-Policy (LNP) sub-TLV of Type-value 3 may be added to the above Table 2.

| 3 | Local-Node-Policy sub-TLV | Associate the Node to one or more network policies, and mark the node with the PDMs defined by the sub-TLV. | Mandatory |

An exemplary format 900 of LNP sub-TLV may be defined as shown in FIG. 9. As shown in FIG. 9, for each policy (e.g., Policy No. 1 through Policy No. N), format 900 may include at least five PDM parameters of 32 bits: an applicable technology layer, a policy type, a policy ID, a domain ID, and a routing level. In some implementations, additional parameters may be included within format 900. The 32-bit Technology Layer of format 900 may be further structured as shown in format 1000 of FIG. 10 to include a switching capacity segment, an encoding segment, signal type segment, and a reserved segment. The switching capacity, encoding, and signal type of format 1000 can be inherited from, for example, international standards such as, RFC 4202, RFC 4203, RFC 6002, and OIF-ENNI-OSPF-02.0.

According to implementations described herein, each LNP sub-TLV can hold multiple policy PDMs for each node, and the sub-TLV is flooded over the network by an OSPF-TE advertising mechanism. The LNP sub-TLV may serve two functions: (1) to mark a node with proper PDMs and (2) to allow node markings to be advertised by OSPF-TE so that policy-enhanced routing topologies can be constructed by either all nodes in the network in a distributive manner or by a centralized PCE and MP-OSS system.

According to implementations described herein, systems and/or methods may assign, to selected network devices in an intelligent transport network, a policy domain marker that identifies a particular network operation policy. The network devices that receive the policy domain marker may collectively delineate a region of enforcement for the particular policy. After an appropriate waiting period to permit the selected network devices to advertise their policy domain marker, the systems and/or methods may distribute, to all network devices in the intelligent transport network that support control plane signaling or control plane routing, an enforcement signal to enforce the particular network operation policy for the delineated region.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIGS. 6-8, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
   assigning, to selected transport nodes in an intelligent transport network, a policy domain marker that identifies a particular network operation policy,
   wherein the selected transport nodes each include one of a router, a switch, or a gateway device,
   wherein the selected transport nodes together delineate a region of enforcement for the particular network operation policy,
   wherein the intelligent transport network includes multiple transport technology layers, and
   wherein the policy domain marker identifies a particular transport technology layer, of the multiple transport technology layers, for which the particular network operation policy is applicable;
   distributing, after the assigning and to all transport nodes in the intelligent transport network that support control plane signaling or control plane routing, an enforcement signal, which is different than the policy domain marker, to enforce the particular network operation policy identified by the policy domain marker for the delineated region; and enforcing, by the selected transport nodes and in response to receiving the enforcement signal, the particular network operation policy including path computation, signaling, or restoration functions for network transit traffic through the selected transport nodes.

2. The method of claim 1, wherein the policy domain marker includes:
a policy type,
a policy identifier,
a domain identifier,
an optical transport network (OTN) layer, and
a routing level.

3. The method of claim 2, wherein the policy type includes one of:
a traffic management policy,
a maintenance policy,
a security policy,
a protection and restoration policy, or
a service topology policy.

4. The method of claim 1, wherein assigning the policy domain marker includes forwarding the policy domain marker via a new generation operation support system.

5. The method of claim 1, wherein distributing the policy domain marker is initiated by a script.

6. The method of claim 1, further comprising:
sending, to one of the selected transport nodes, another policy domain marker that identifies another network operation policy, different from the particular network operation policy, wherein the other network operation policy is configured to be implemented separately from the particular network operation policy.

7. The method of claim 1, further comprising:
assigning, to additional selected transport nodes in the intelligent transport network; the policy domain marker, wherein the additional selected transport nodes that receive the policy domain marker define an additional region of enforcement for the particular network operation policy.

8. The method of claim 1, further comprising:
distributing, to all transport nodes in the intelligent transport network that support control plane signaling or control plane routing, a deactivation signal to terminate the particular network operation policy for the delineated region; and
distributing, to the selected transport nodes in the intelligent transport network, a removal signal to clear the policy domain marker from the selected transport nodes.

9. The method of claim 1, further comprising:
indicating a particular wait time between the assigning and the distributing to permit discovery of the policy domain marker to be advertised throughout the intelligent transport network.

10. A method, comprising:
receiving, by a device in an intelligent transport network, a routing advertisement including a policy domain marker that identifies a particular network operation policy, wherein the policy domain marker includes parameters for an applicable technology layer, a policy type, a policy identifier, a domain identifier, and a routing level for the particular network operation policy;

updating, by the device, a network routing baseline topology, for the intelligent transport network, based on the routing advertisement;
applying, by the device, the policy domain marker to create a policy-aware network routing topology for the intelligent transport network;
receiving, by the device, a path computation request with traffic engineering constraints;
identifying, by the device, that the particular network operation policy is in effect;
identifying, by the device, a policy domain boundary for the particular network operation policy based on the policy domain marker; and
creating, by the device, a modified routing topology that satisfies the particular network operation policy and the traffic engineering constraints.

11. The method of claim 10, further comprising:
performing, by the device, a path computation, for the path computation request, using the modified routing topology.

12. The method of claim 10, wherein the routing advertisement that includes the policy domain marker is a link state advertisement (LSA).

13. The method of claim 10, wherein the device is one of:
a centralized management plane (MP) operation support system (OSS) for the intelligent transport network, or
a network element that supports control plane signaling or control plane routing.

14. A network device, comprising:
one or more input ports for receiving network transit traffic;
one or more output ports transmitting the network transit traffic; and
a control plane processor configured to:
receive, via an operation support system (OSS) and a management plane for an intelligent transport network, a marking indication assigning a policy domain marker to the network device, wherein the policy domain marker includes parameters for applying a particular network operation policy, and wherein the parameters include an applicable technology layer, a policy type, a policy identifier, a domain identifier, and a routing level for the particular network operation policy,
advertise, to other devices in the intelligent transport network, the assignment of the policy domain marker with local routing topology for the network device,
receive advertisements indicating assignment of the policy domain marker to at least some of the other devices in the intelligent transport network,
receive, after receiving the advertisements, a signal to enforce the particular network operation policy corresponding to the policy domain marker, and
enforce the particular network operation policy for the network transit traffic through the input ports and output ports.

15. The network device of claim 14, wherein the control plane processor is further configured to execute instructions to:
receive a removal signal to clear the policy domain marker from the network device, and
exclude an indication of the policy domain marker in ongoing advertisements with local routing topology.

16. The network device of claim 14, wherein the control plane processor is further configured to execute instructions to:

receive advertisements indicating assignment of the policy domain marker to other devices in the intelligent transport network, and detect a boundary for the policy domain based on the advertisements.

17. The network device of claim 14, wherein, when advertising the assignment of the policy domain marker, the network device uses an Open Shortest Path First-Traffic Engineering (OSPF-TE) link state advertisement (LSA).

* * * * *